INVENTORS
SATOSHI ANDO,
MASAO MATSUI,
FUMIMARO OGATA
BY
Stevens, Davis, Miller & Mosher
ATTORNEYS

3,725,192
COMPOSITE FILAMENTS AND SPINNERET AND METHOD FOR PRODUCING SAME

Satoshi Ando, Osaka, Masao Matsui, Takatsuki, and Fumimaro Ogata, Nishinomiya, Japan, assignors to Kanegafuchi Boseki Kabushiki Kaisha, Tokyo, Japan, and SNIA Viscosa Societa Nazionale Industria Applicazioni Viscosa S.p.A., Milan, Italy
Continuation of application Ser. No. 706,023, Feb. 16, 1968. This application Aug. 31, 1970, Ser. No. 68,506
Claims priority, application Japan, Feb. 25, 1967, 42/11,961, 42/11,962, 42/11,963
Int. Cl. B29f 3/10; D02g 3/00
U.S. Cl. 161—175                                    5 Claims

ABSTRACT OF THE DISCLOSURE

Production of a two-component unitary filament having a given uniform cross-sectional configuration and comprising sheath and core portions consisting of a first and a second synthetic polymers respectively, and produced by separately fluidifying said polymers and simultaneously and concurrently feeding both polymers through a common spinneret orifice for extruding therefrom a composite filament, wherein the said second polymers forms a part of its cross-section, said part being both inwardly and outwardly enclosed by said first polymer and its major portion is located outside the concentric ½ similar shape of the cross-section of the filament.

---

This application is a continuation of application Ser. No. 706,023, filed Feb. 16, 1968, and now abandoned.

The present invention relates to a two-component filament having an improved dyeability, delustering effect and dynamic property, in which two thermoplastic linear polymers are bonded in a sheath-core type and one or more cores are formed in a unitary filament.

It has been hitherto well known that two-component filament, in which two thermoplastic linear polymers are arranged in a side-by-side type or a sheath-core type at the cross-section of the filament has latent crimpability and develops excellent crimps with a heat or swelling treatment.

Generally, when filaments are used for fibers for clothing, it is desirable that they are excellent in all of the strength, elasticity, dyeability, etc. However, when polyamide filament is employed, it has various excellent characteristics, but it is insufficient in elastic property (initial modulus), so that the resulting fiber has poor resiliency, which causes serious problems in practice. While polyester filament has poor dyeability, it has many excellent characteristics, particularly excellent modulus of elasticity.

Recently, there has been proposed a spinning method, wherein two different polymers are conjugate spun in a sheath-core relation to form a unitary filament having both characteristics of the two polymers.

There has been known a method for producing a conjugate filament having excellent polyamidic properties together with an improved elastic property, wherein a highly elastic polymer and a polyamide are conjugate spun in a core and sheath relation to form a unitary filament, and thus improving the elastic property of the polyamide filament which has been the greatest drawback thereof. In general, when a polyamide having poor elastic property and a highly elastic polymer are conjugate spun in a sheath-core relation, the highly elastic polymer is arranged in the core portion and the polyamide in the sheath portion. The reason is based on the fact that in a large number of thermoplastic synthetic polymers, the polymers having an excellent elastic porperty are high in crystallinity, melting point and hydrophobic property, but are poor in dyeability, and further they are poor in stability at the conjugate spinning step or drawing step. On the other hand, the polymers having poor elastic property has completely opposite properties to the polymers having excellent elastic property. For this reason, some attempts have been made for producing a filament having both an improved dyeability and an improved elastic property by arranging a highly elastic polymer having poor dyeability, spinnability and drawability in the core portion and surrounding the core with a copolyamide having excellent dyeability, spinnability and drawability, whereby the drawbacks of both polymers are complementarily eliminated.

The inventors have made wide investigations into such sheath-core type composite filaments and confirmed that when a highly elastic polymer is used in the core portion, the elastic property in the longitudinal direction of the filament apparently increases in proportion to the amount of the highly elastic polymer used. However, it has been found that since a major part of the core consisting of the highly elastic polymer positions in the central zone of the filament, the elastic property in the lateral direction of the filament is hardly improved.

It is further known that pigments, such as titanium oxide, etc. have been in the most of cases added in order to opalize and deluster the resulting filament, but such addition leads to the coagulation of powdery titanium oxide which forms knots in the obtained filament, that when the obtained filament is knitted into knitted goods, needles of knitting machine are worn off, and that the chemical reaction of polymers constituting the filament, for example, the degradation of the polymers due to the oxidation in bleaching step or irradiation of ultraviolet ray is accelerated. Therefore, it is preferable to produce a filament having delustering effect without the use of such a delustering pigment.

The inventors have also found, after having made various investigations into a composite filament comprising two different thermoplastic linear polymers wherein at least three cores consisting of one of said polymers are embedded in a sheath of the other polymer, that a certain kind of filaments as such having a specified structure solves the above mentioned problems completely and the present invention has been accomplished.

Some of the sheath-core type composite filaments having a plurality of cores have been already known in the Japanese patent application publication No. 29,636/64 and U.S. Pat. No. 2,932,079. However, the composite filament described in the specification of the above Japanese patent application publication No. 29,636/64 is to be used as an intermediate material for further producing a special type of filament from the core portion having a particular shape which is freed by dissolving and removing the sheath portion from the composite filament, and is not a filament produced for the purpose of improving dyeability, modulus of elasticity, delustering effect, etc. While, the filament described in the above U.S. Pat. No. 2,932,079 specification is a multi-core filament having particular optical characteristics, such as shot color, luster, and the like, that is an effect quite opposite to delustering.

As far as the elastic properties of the filaments are concerned, such properties, expressed by the bending rigidity and the torsional rigidity, are factors for estimating the elastic property of the filament more practically than the elastic property in the longitudinal direction and the property of the outer periphery portion of filament most contributes to said factors.

For example, in a concentric sheath-core type filament having a circular cross-section, in which a core of a highly elastic polymer is arranged concentrically in a sheath of polyamide, when the core and the sheath are in a volume ratio 1:3, the contribution of the core of highly elastic polymer located in the central zone which occupies ¼ of the whole cross-sectional area of the filament (inside the concentric circle having a radius of ½ of that of the filament) to the bending rigidity or torsional rigidity of the filament is only 12.5% of the total, and even when the above-mentioned ratio is 1:1, said contribution of the core is no more than 25%. As seen from this fact, in order to increase the bending or torsional rigidity of the sheath-core type composite filament by using the highly elastic polymer as the core component, the amount of the core component must be increased extremely, so that the dyeability, spinnability and drawability are adversely affected, and composite filaments having both the excellent dyeability and satisfactory dynamic property can not be obtained.

Some types of multi-component filaments have been already disclosed in the U.S. Patent No. 2,932,079 specification, but the object of said disclosure is to provide filaments having optical characteristics, such as shot color, luster and the like, and is not to improve the modulus of elasticity.

In the conventional conjugate spinning process, when a core-forming polymer is melt-extruded from a plurality of interior orifices (core orifices) into a molten sheath-forming polymer and thereafter the two polymers are simultaneously extruded from a common spinneret orifice to form a multi-core filament, it is conceivable that a plurality of core orifices be disposed in as much spaced relation with one another as possible, in order to arrange a plurality of the cores near the periphery of the filament, but in such a case the size of spinneret should be made large, so that the density of orifice on the spinneret decreases and the productivity is lowered.

Therefore, an object of the present invention is to provide an improved textile filament having both a high modulus of elasticity and an excellent dyeability.

Another object of the present invention is to provide a crimped filament having an excellent crimp property from the above mentioned filament.

Further object of the present invention is to produce easily and economically a filament having the above-mentioned characteristics.

It is also an object of the present invention to provide an improved textile filament having both a high modulus of elasticity and an excellent dyeability as above, and further having a delustering effect even without the addition of pigments.

The present invention provides also an improved method for producing a two-component filament having excellent modulus of elasticity, dyeability and delustering effect which has so far been neither obtained nor expected by the above-mentioned well-known techniques, and a spinneret to be used for spinning said filament.

That is to say, a still further object of the present invention is to provide an improved spinning process for producing easily a two-component multi-core filament, in which cores are located near the peripheral surface of the unitary filament, and a spinneret for spinning said filament.

As it will be made more apparent as this description proceeds, the location of the highly elastic polymer in the outermost rather than in innermost portion of the unitary filament is of great importance as the resistance and the dynamic properties of such filament are to be dealt with. In view of better definition of essential features of this invention, the cross-section of the filament will be hereinbelow considered as ideally divided into inner and outer portions of similar outer configuration having a common center of gravity. Such terms "inner portion" and "outer portion" of the cross-section, are intended to mean, as this description proceeds and in the appended claims, the cross-sectional portions located respectively inside and outside an ideally traced boundary line which has a shape identical with that of the outline of the cross-section and which bisects a radius of the cross-section or the distance between the center of gravity and the periphery, the said inner portion being confined within said boundary line and said outer one being the portion confined between said boundary line and said outline.

In addition, a term such "concentric ½ similar shape" will indicate such ideally drawn boundary line in the cross-sectional shape of the unitary filament.

Taking the above and other considerations in mind, this invention provides a new and useful article which consists of a composite filament comprising sheath and core portions formed by a first polymeric material having an excellent dyeability and by a second polymeric material having superior elastic properties respectively, wherein the said first material is arranged in the cross-section of the filament both adjacently to the outline of said cross-section and in and adjacently to the center of the said cross-section, and the said second polymeric material is spaced both from said outline and said center and has the greater part of its individual cross-sectional area outside the concentric ½ similar shape of the cross-section of the filament, as hereinbefore defined, the said second polymeric material having an electricity modulus at least 10 g./d. higher than that of said first polymeric material.

According to one embodiment of this invention, the said core portion consists of a plurality of subportions formed of the said second material and individually and spacedly embedded in the said first material forming both the parts adjacent to the surface and the part including and adjacent to the axis of the filament. This aspect of the invention is of particular interest when the above considered delustering effect is of interest.

According to another embodiment of the invention, the said core portion is annular and has parts consisting of the said first material adjacent both to its outer and to its inner contour, that is said annular core portion is located between an innermost portion and a surface portion of said first material.

According to a preferred feature of the invention the first sheath-forming material has an elasticity modulus not greater than 35 g./d. and the said second core-forming material has an elasticity modulus not lower than 30 g./d.

According to another preferred feature of the invention, the said first embodiment thereof is further improved, as the said delustering effect is concerned with, by promoting a synergistic effect of a suitable difference between the individual refractive indexes of said first sheath-forming material and the second core-forming material, taking into account the number, the shape and the location of the cores. Although it had been very difficult for the inventors to analyse each factor independently in the experiment, the analysis of these factors clarified the following facts. That is to say, unless the difference in the refractive index between the core polymer and the sheath polymer is more than 0.05, the unique delustering effect, which can be attained without adding delustering pigments, does not appear remarkably. Furthermore, the larger the number of cores is, the smaller cross-sectional area the individual core has, and furthermore the nearer to the peripheral surface of the filament the arrangement of the core is, the more remarkable the delustering effect is. Therefore, it is effective that the filament has at least three cores and at least one half of the total cross-sectional area of the cores is positioned outside the concentric ½ similar shape.

Of course, it is not necessary for the individual cores spacedly arranged in the cross-section of the unitary filament to have the same cross-sectional area. The cross-sectional area of the individual core is less than ¼, preferably ⅒–¹⁄₁₀₀ of the cross-sectional area of the filament.

As is influenced by the number, the shape and the arrangement of the cores, the effect of multi-core structure generally appears remarkably when the total cross-sectional area of the cores is more than 10% based on the cross-sectional area of the filament.

The improvement in the dynamic property of the filament, particularly in the modulus of elasticity that is another object of the present invention is influenced not only by the difference in modulus between two spinning materials as in the case of the above delustering effect, but also by the number, the shape and the arrangement of the cores.

Generally, most of polymers for spinning materials which have a high tenacity or high modulus of elasticity exhibit a low dyeability, and on the contrary those having a high dyeability tend to show a low modulus of elasticity. The reason is based on the fact that the higher crystallinity or hydrophobicity the polymer has, the lower dyeability and the higher tenacity or modulus of elasticity does it exhibit.

For a better understanding of the invention, reference is taken to the accompanying drawings, wherein FIGS. 1, 2 and 3 are cross-sectional views, in greatly enlarged scale, of conventional multi-core and single-core filaments;

FIGS. 4 to 9 inclusive are similar views of typical two-component filaments according to the multi-core embodiment of the invention;

Figure 1:
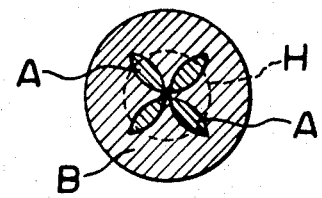
Figure 2:
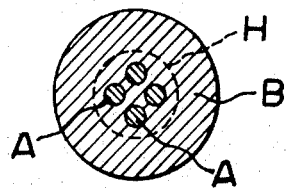

Referring first to FIGS. 1 to 11 inclusive: as indicated above, the bending and the torsional rigidities are highly influenced by the sheath portion or surface layer of the filament. Assuming, for simplicity sake, that the filament is of circular cross-sectional shape, such as illustrated in FIGS. 1 to 7 and 10, the contribution of its said inner portion having a cross-sectional area of ¼ of that of the filament (portion inside the concentric circle having a radius of ½ of that of the filament) to the total bending rigidity or torsional rigidity of the filament is only 12.5% of the total. Furthermore, when a two-component multi-core filament is spun by varying kind of polymer, extruding amount, extrusion temperature and the like with the use of a conventional spinneret for multi-core filament, the spacedly extruded cores are liable to be collected in the central portion of the filament. Therefore, the resulting filament has a cross-section as shown in FIG. 1 or 2, and although a spinning material having high modulus of elasticity is used for the core, none the less the improvement of the bending and torsional characteristics is slight.

On the other hand, the filament according to the invention, in which a number of cores composed of a component having a high modulus of elasticity are in a spaced relation with one another embedded in the sheath portion, has high resistances against the bending or torsional strain, and has an improved elastic property.

In the several embodiments of FIGS. 1 to 11 inclusive, the sheath-forming material has been indicated by reference B and the core-forming material by reference A. The said ideally drawn border line between the inner and outer portions in the cross-section of the filament, that is its concentric ½ similar shape, has been indicated by reference H and shown by a dotted line.

Figure 4:
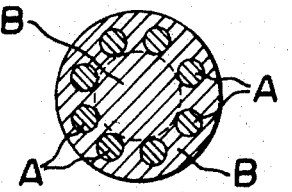
Figure 5:
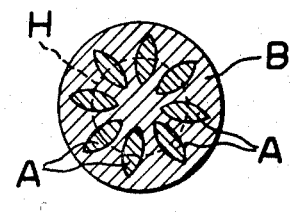

When the sheath portion is composed of a component having an extremely low modulus of elasticity and is liable to be deformed, upon bending of the filament, a plurality of cores may displace corresponding to the bending deformation of the sheath portion, so that the apparent bending rigidity of the filament may be decreased, but upon torsion of the filament, the displacement of a plurality of cores does not occur, for the torsion is considered as a concentric or revolutionally symmetrical stress. Therefore, the multi-core filament according to the invention has an excellent property particularly against the torsional deformation and is most suitable for textured yarn which is manufactured by applying a torsional strain to the filament as in the false twisting process. When the multi-core filament obtained according to the invention is subjected to a false twisting, the resulting filament has excellent crimps. In order to increase the resistance against such a torsional strain, it is desirable that a plurality of cores are spacedly arranged symmetrically and concentrically (including revolutional symmetry herein) as shown in FIGS. 4 and 5. However, the multi-core filaments, in which the symmetry or concentricity is more or less disturbed as shown in FIGS. 6–9, can be considered as substantially concentric, and a satisfactory effect can be expected.

Figure 3:
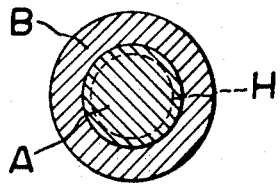
Figures 9, 10:
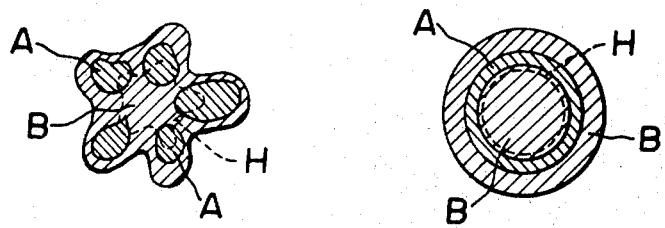
FIGS. 10 and 11 are similar views of filaments according to the annular core embodiment of the invention.

In the conventional well-known sheath-core type composite filament as shown in FIG. 3, a polymer A having a high elasticity is arranged in the core portion and a polyamide B having an elasticity lower than that of the polymer A is arranged in the sheath portion, so that polymers A and B are positioned concentrically with each other. FIG. 10 shows an enlarged cross-sectional view of an embodiment of the filament according to the present invention, in which in order to improve the bending rigidity or the torsional rigidity remarkably as compared with the conventional sheath-core type composite filament as shown in FIG. 3, the highly elastic polymer A is arranged in the outside of the concentric ½ similar shape of the cross-section of the filament and the polyamide B is arranged in the central portion and sheath portion of the filament.

Figure 11:
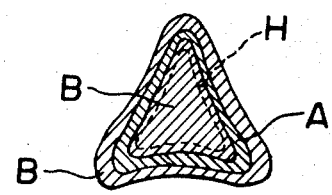

FIG. 10 is one embodiment of the composite filament in which a highly elastic polymer A and a polyamide B are arranged concentrically, while other composite filaments in which the symmetry and the concentricity are disturbed more or less to such an extent that the substantial effect of the invention is not lost, are also included in the present invention. It is well known that when the concentricity between the two polymers A and B in the composite filament is disturbed and lost, such a composite filament develops spiral three-dimensional crimps upon a shrinking treatment. When the filament according to the present invention obtained by conjugate spinning the polymers A and B in an eccentric relation of such an extent that the effects of the invention, i.e., superior bending and torsional characteristics are not substantially affected adversely, is subjected to a shrinking treatment, the resulting three-dimensionally crimped composite filament also has excellent bending and torsional characteristics. FIG. 11 is an embodiment of the composite filament according to the invention, which has a trilobal cross-section, and has substantially the same characteristics as those of the filament having circular cross-section as shown in FIG. 10.

Figure 12:
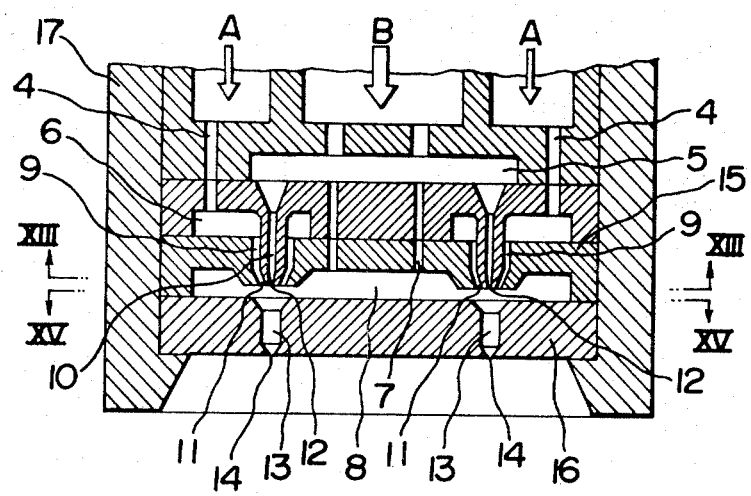
FIG. 12 is a diametral sectional view of a prefered embodiment of a spinneret according to the invention for spinning the above filaments.

FIG. 12 is a vertical cross-sectional view of one embodiment of spinneret to be used for spinning the composite filaments according to the invention. The spinneret shown in FIG. 12 comprises an outer spinneret plate 16 provided with one or more spinning orifices 14 bored therethrough, an inner spinneret plate 15 provided with internal injecting passages 10 each co-axial to one of said spinning orifices 14 and external injecting passages 9 arranged co-axially to and surrounding said internal passages 10, a space 8 confined between said inner spinneret plate 15 and said outer spinneret plate 16 and communicating with the conduits 13 of the spinning orifices 14 and with the outlet ends 11 and 12 of said passages 9 and 10 respectively, first duct means for supplying liquid pressurized spinning material to both the passage 10 and the space 8 and second duct means for supplying the other fluidified and pressurized spinning material to the external passages 9. A polyamide B and a highly elastic polymer A are fed into polymer feeding chambers 1 and 2 by gear pumps respectively, and both the polymers are fed into reservoirs 5 and 6 through channels 3 and 4 respectively.

One part of the polyamide B of sheath-forming component, is fed into a space 8 from the reservoir 5 through a channel 7 and embraces flows of core-forming polymer A extruded through external injecting passages 9, and the other part of the polymer B is extruded through an internal injecting passage 10 forming an inner flow forcedly fed into the conduit 13 which acts so as to push the flow of core-forming polymer A extruded through the external injecting passages 9 outwards. The fluidized and pressurized core-forming polymer A is extruded from the external injecting passages 9 outwards. The fluidified and form core(s). The flow of core portion extruded from the passage 9 is put between the inner flow of polymer B for the central portion extruded from the internal injecting passage 10 and the outer flow of sheath-forming polymer B forcedly fed from the space 8 and bonded in the vicinity of the orifice walls, and then the bonded polymers are spun from spinning orifice 14 through a conduit 13 to form a unitary filament, in which the highly elastic polymer A is arranged as a concentric core portion. The numeral 17 represents a holding cylinder.

In order to arrange the core portion concentrically to the sheath portion, it is desirable to make the shape or disposition of the external injecting passages 9 similar to that of the spinning orifice 14. The amount and the position of the core-forming polymer A occupying the cross-section of the resulting composite filament can be controlled by selecting properly the amount of the polymer flown out from the internal injecting passage, diameters of the channel 7 and the internal injecting passage 10, and the extrusion pressures.

Figure 13A:
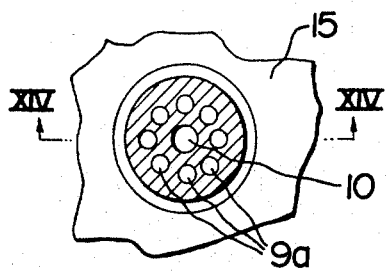
FIGS. 13A, 13B and 13C are cross-sectional views taken in the plane indicated at XIII—XIII in FIG. 12, illustrating in larger scale and detail several structures of passages and orifices with which the spinneret, such as shown in FIG. 12, can be provided for adaptation thereof for spinning a filament of the type illustrated in FIG. 4 and respectively in FIG. 10 and in FIG. 6.
Figure 13B:
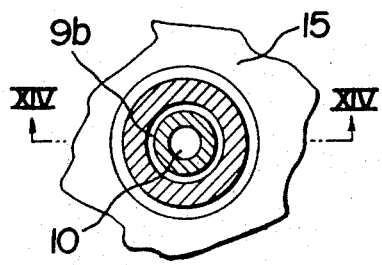
Figure 13C:
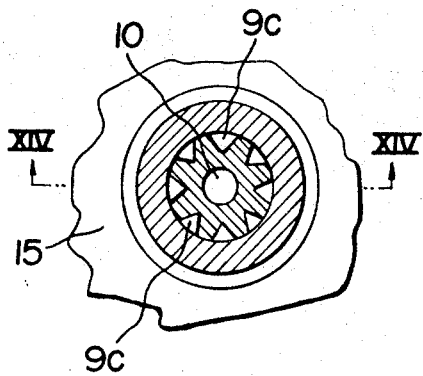
Figure 14:
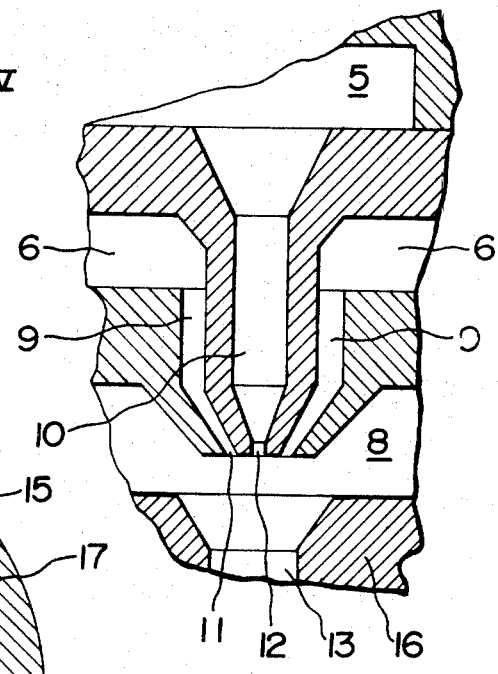
FIG. 14 illustrates in greater detail a particular view of the spinneret in cross-sectional view taken in plane XIV—XIV of any of FIGS. 13A to 13C.
Figure 15:
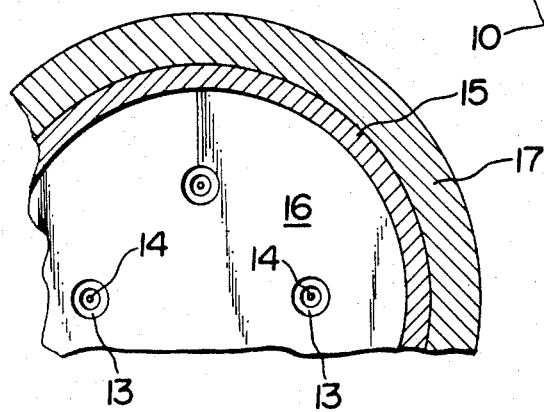
FIG. 15 is a fragmentary cross-sectional view taken in the plane indicated at XV—XV in FIG. 12.

FIGS. 13A to 13C are believed to be self-explanatory.

Figure 6:
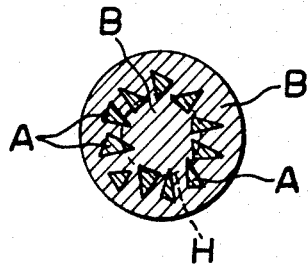
Figure 7:
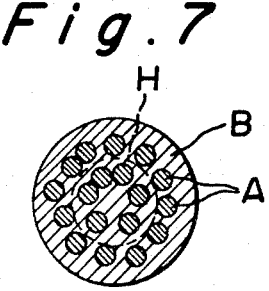
Figure 8:
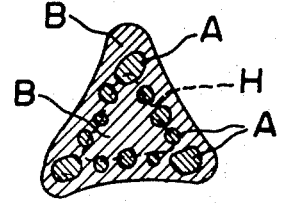

The passages 9a of FIG. 13A provide a plurality of flows of polymer A which, upon spinning, will be arranged and embedded within polymer B as shown in FIG. 4. The annular passages 9b of FIG. 13B will provide a layer-like core such as shown in FIG. 10 and the small triangle-shaped passages 9c of FIG. 13C will provide a filament such as shown in FIG. 6. Other either circular and not circular filaments will be provided by providing a proper number of passages of the required shape and arrangement.

The dynamic properties of the filaments of this invention will be now discussed with relation to the layer-like core type of FIG. 10.

The preferable amount of the highly elastic polymer A in the unitary filament according to the invention is 10–50% by volume as described above. In case of less than 10% by volume, the contribution of the highly elastic polymer A to the total elastic properties, particularly to the bending characteristics is very small.

However, the object of the present invention can be attained fully when the amount of the highly elastic polymer in the filament is less than 50% by volume. For example, even when the amount of the highly elastic polymer arranged in the core portion is 50% by volume in the conventional filaments, the contribution of the highly elastic polymer to the total bending rigidity or torsional rigidity of the filament is only 25% of the total as described above, while in the composite filament according to the invention, even when the amount of the highly elastic polymer A is the same 50% by volume as that in the conventional filament, and the polymer A is arranged in such a manner that the inner face of the layer of polymer A is positioned on and along an ideal curve traced at ½ the distance between the central point and the periphery of the filament, the contribution of the highly elastic polymer A to the total bending rigidity or torsional rigidity of the filament increases highly up to 50% of the total.

As mentioned above, the dynamic property of the composite filament is influenced by the position of the layer-like core portion and the volume ratio of the two polymers, and further highly influenced by the modulus of elasticity of the polymer used as the layer-like core portion. When the difference in modulus of elasticity between both the polymers is less than 10 g./d., a two-component composite filament having a high modulus of elasticity and an excellent dyeability can not be obtained, however varied said position and said volume ratio may be.

As the highly elastic polymers to be used for the filament according to the invention, mention may be made of aromatic polyesters, such as polyethylene terephthalate and copolymers consisting mainly of polyethylene terephthalate, aromatic polyamides, such as polyhexamethylene terephthalamide and polyparaxylylene sebacamide, polycarbonates, polystyrene, polypropylene, polyvinyl chloride, polyurea, etc.

As the polyamides to be used for forming sheath portions of the filament according to the invention, mention may be made of aliphatic polyamides, such as polycaprolactam, polyenantholactam, polyhexamethylene adipamide, polyhexamethylene sebacamide and copolyamides thereof, and copolymers consisting of a large amount of aliphatic polyamide and a small amount of aromatic polyamide such as polyhexamethylene terephthalamide, polyhexamethylene isophthalamide, polyundecamethylene terephthalamide, polymetaxylylene terephthalamide, etc.

The filament according to the invention may contain additives, such as delustering agents, pigments, light stabilizers, etc.

The two-component composite filament according to the invention contains a small amount of highly elastic polymer, has a considerably improved bending rigidity and torsional rigidity, and has an excellent dyeability, spinnability and drawability, and further can be produced in a low cost, so that it can be advantageously applied to new demands for garments.

According to the invention, the modulus of elasticity is determined as follows:

Sample _____ Unitary filament of 3–5 deniers.
Length of sample _____ 5 cm.
Rate of elongation _____ 50%/min.
Measuring apparatus _____ Instron tester.
Temperature and humidity _ 25° C. and 65% RH.
Modulus of elasticity _____ From the gradient of a tangent at the position of the steepest gradient in the initial strain-stress curve (at an elongation less than 5%), a stress (g./d.) at 100% elongation was extrapolated.

Generally, the value of modulus of elasticity varies depending upon the conditions at spinning, drawing and heat-treatment, but for the present invention it is sufficient that the modulus of elasticity is measured with respect to one-component filaments produced by using each polymer to constitute the composite filament, under the same spinning, drawing and heat-treating conditions as those under which the composite filament is spun.

The following examples are given in illustration of this invention and are not intended as limitations thereof.

EXAMPLE 1

Polyethylene terephthalate having an intrinsic viscosity [η] of 0.67 in o-chlorophenol at 30° C. was used as a layer-like core-forming polymer in an amount of 30% by volume, and polycaprolactam having an intrinsic viscosity [$\eta$] of 1.15 in m-cresol at 30° C. was used as a sheath in an amount of 70% by volume. The two-polymers were conjugate spun at 280° C. with the use of a spinneret having a structure as shown in FIGS. 12 and 13B to obtain undrawn filaments. The resulting undrawn filaments were hot drawn 3.6 times their original lengths on a snubbing pin being heated at 70° C. to obtain a multifilament of 70 d./18 f., the unitary filament of which had a concentrically conjugated circular cross-section as shown in FIG. 10.

By using 30% by volume of the above described polyethylene terephthalate as the core-forming material and 70% by volume of the above-described polycaprolactam as the sheath-forming material, a conventional concentric sheath-core type composite filament as shown in FIG. 3 was spun and drawn in the same condition as described above to obtain 70 d./18 f. of multifilament. Each of the above-mentioned polycaprolactam and the above-mentioned polyethylene terephthalate was spun and drawn solely under the same condition as described above to obtain a multifilament of 70 d./18 f. The initial modulus of the filament according to the invention was 55.1 g./d., that of the conventional composite filament was 53.0 g./d., that of polycaprolactam filament was 20.5 g./d. and that of polyethylene terephthalate filament was 86.5 g./d.

The above-mentioned four filaments were subjected to false twisting under the following condition.

False twisting conditions:
Feed rate _____ m./min__ 45
Revolution velocity of spindle _____ r.p.m__ 150,000
Heater (curved plate):
   Length _____ cm__ 60
   Surface temp. _____ ° C__ 165
Delivery rate _____ m./min__ 46
Take up velocity _____ m./min__ 42

The thus processed textured yarn was formed into a skein of about 1,000 deniers, which was boiled in water at 100° C. under a tensionless state for 10 minutes and air-dried, and then the crimping property of the yarn was measured. The result as shown in Table 1 was obtained. The crimping property is shown by the elongation and the crimp recovering percentage for elongation defined by the following Formulae I and II.

$$\text{Elongation (percent)} = \left(\frac{L_1 - L_0}{L_0}\right) \times 100 \quad (I)$$

Crimp recovering percentage for elongation (percent)

$$= \left(\frac{L_1 - L_2}{L_1 - L_0}\right) \times 100 \quad (II)$$

In the above formulae, $L_0$: Length of the sample one minute after a load (initial load) of 20 mg./d. is applied to it.
$L_1$: Length of the sample one minute after a load or 200 mg./d. is applied to it, and
$L_2$: Length of the sample when a load of 200 mg./d. is applied to for one minute and then changing the load to 20 mg./d. (recovering load), the sample is left to stand for one minute to recover from the elongation.

TABLE 1

| Filament | Elongation percent | Crimp recovering percentage for elongation percent |
|---|---|---|
| Filament according to the invention | 67.4 | 17.1 |
| Conventional filament | 54.0 | 15.3 |
| Polycaprolactam filament | 52.8 | 14.9 |
| Polyethylene terephthalate filament | 34.6 | 25.0 |

As seen from Table 1, when the initial load and the recovering load were as relatively large as 20 mg./d., the filament according to the invention showed an excellent crimp recovering property. When such textured crimped yarns were used for the production of knitted and woven fabrics, the yarn according to the invention produced knitted and woven fabrics having an improved bulkiness, bending rigidity and torsional rigidity.

EXAMPLE 2

Each of the following three highly elastic polymers and polycaprolactam were conjugate spun from a common orifice with the same extrusion rate (by volume) at 280° C. using the spinneret having a structure as shown in FIGS. 12 and 13B and the resulting undrawn filament was hot-drawn at an appropriate draw ratio on a snubbing pin being heated at 80° C. to obtain a monofilament of 15 deniers respectively. The cross-section and the core shape of the highly elastic polymer of the resulting filament were as shown in FIG. 10.

The highly elastic polymers used are as follows:

(A) polyethylene terephthalate having an intrinsic viscosity [$\eta$] of 0.65 in o-chlorophenol at 30° C.,
(B) polymetaxylylene adipamide having an intrinsic viscosity [$\eta$] of 0.88 in m-cresol at 30° C., and
(C) isotactic polypropylene having a specific gravity of 0.90 and a melt index of 6.

Furthermore, a conventional sheath-core type composite filament as shown in FIG. 3 was obtained by conjugate spinning and drawing in the same condition and manner as described above, except that the above-described highly elastic polymer was surrounded by the sheath of polycaprolactam concentrically. On the other hand, each of the polymers A, B, and C used for the above-mentioned composite filaments was spun and drawn solely to obtain monofilaments A, B, and C of 15 deniers. The initial moduli of the resulting filaments A, B and C were 81.0 g./d., 43.5 g./d. and 41.3 g./d. respectively, and these were higher than that of the polycaprolactam filament, 17.5 g./d. Each of three filaments according to the invention and each of three conventional filaments were cut into staples having a length of 3 cm. respectively. Then 20 g. of the respective staples were introduced into a measuring cylinder having a diameter of 5 cm. and a length of 20 cm., a piston of 200 g. weight was mounted on the staples and thereafter said measuring cylinder was subjected to a fine vibration. The equilibrium position of the piston was read (the height was $h_1$).

Then, a load of 600 g. was further applied onto said piston and the equilibrium position of the piston was read in the same manner as described above (the height was $h_2$).

The higher bending rigidity the filament has, the lower the compression degree (percent)

$$\left(\frac{h_1 - h_2}{h_1} \times 100\right)$$

under the same load is.

The above mentioned six filaments were subjected to dyeing test with acidic dye as follows:

The dye adsorption (percent) of these filaments, when they were dyed with 1% (O.W.F.) of Rokuserin NS (trade name for naphthionic acid β-naphthol,

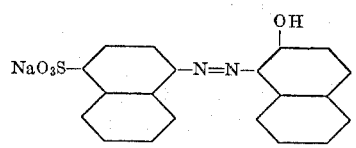

manufactured by Sumitomo Chemical Co.) and 1% (O.W.F.) of acetic acid at a bath ratio of 1:50 at 80° C. for 60 minutes was determined.

The initial modulus, the bending stress (compression degree) due to compression applied to the staples and the dye adsorption of each filament are shown in Table 2.

TABLE 2

| Filament | Polymer used for core | Initial modulus (g./d.) | Compression degree (percent) | Dye adsorption (percent) |
|---|---|---|---|---|
| Filament according to the invention | A | 62.4 | 24.1 | 74 |
| Conventional filament | A | 59.6 | 43.0 | 73 |
| Filament according to the invention | B | 38.1 | 46.9 | 95 |
| Conventional filament | B | 37.6 | 62.2 | 95 |
| Filament according to the invention | C | 36.0 | 54.8 | 73 |
| Conventional filament | C | 35.5 | 67.6 | 71 |

As seen from Table 2, although both of the filaments according to the invention and the conventional filaments had substantially the same initial moduli, they were considerably different in the compression degree which is an indication of bending rigidity. That is to say, the filament according to the invention had considerably improved bending characteristic and also substantially the same dye adsorption as that of the conventional filament.

Furthermore, both the polyethylene terephthalate (PET) and the polycaprolactam used in the above-mentioned experiment were conjugate spun and drawn, except that the extrusion ratio was varied as shown in the following Table 3 to obtain a layer-like core and sheath type of composite filament having a structure as shown in FIG. 10. The extrusion ratios initial moduli, compression degrees and dye adsorptions are shown in Table 3.

TABLE 3

| Extrusion ratio (by volume) | | Initial modulus (g./d.) | Compression degree (percent) | Dye adsorption (percent) |
|---|---|---|---|---|
| PCL | PET | | | |
| 100 | 0 | 17.5 | 70.6 | 96 |
| 95 | 5 | 22.1 | 68.1 | 92 |
| 92 | 8 | 26.2 | 55.0 | 90 |
| 90 | 10 | 28.0 | 48.2 | 88 |
| 70 | 30 | 42.6 | 42.4 | 81 |
| 60 | 40 | 54.1 | 31.9 | 78 |
| 50 | 50 | 62.4 | 24.1 | 74 |
| 40 | 60 | 74.2 | 21.0 | 53 |
| 0 | 100 | 86.5 | 12.8 | 0.3 |

As seen from Table 3, when the amount of highly elastic polymer in the resulting composite filament was less than 10% by volume, the compression degree of the composite filament was very high, and namely, the bending rigidity was not highly improved. On the other hand, the said amount was more than 50% by volume, the bending rigidity of the resulting composite filament was remarkably improved, while the dye adsorption was considerably decreased.

EXAMPLE 3

Polycaprolactam and polyethylene terephthalate used in Example 1 were conjugate spun at an extrusion ratio of 9:1 (by volume) in a slightly eccentric sheath-core relation and drawn in the same manner and under the same condition as described in Example 1 to obtain in multifilament of 70 d./18 f. Four series of experiment were carried out in which the core component was arranged in the following four manners respectively (1) The core component was arranged in the central portion of the filament (conventional filament).

(2) The core component was arranged as a layer-like core portion inside the concentric ½ similar shape of the cross-section of the filament (filament not included in the present invention).

(3) The core component was arranged in such a manner that the inner side of the layer-like core portion was arranged along a curve of the concentric ½ similar shape (filament according to the invention).

(4) The core component was arranged as a layer-like core portion outside and along the circle having a radius of ¾ of that of the filament (filament according to the invention).

The above-mentioned filaments 1–4 were subjected to a crimp developing treatment to obtain multifilaments having substantially the same degree of crimps (the four kinds of filament were shrunk at various temperatures, and among the resulting filaments, filaments having the same degree of crimps were selected).

The above-mentioned three-dimensionally crimped filament had a number of crip of 12 per cm. and a crimping percentage of 63%.

The compression degree was determined with the use of 20 g. of the above-mentioned crimped filament by applying a load as described in Example 2 to obtain a result as shown in Table 4.

TABLE 4

| | Initial modulus (g./d.) | Compression degree (percent) |
|---|---|---|
| Filament: | | |
| 1 | 31.4 | 51.4 |
| 2 | 31.3 | 45.9 |
| 3 | 30.9 | 32.2 |
| 4 | 31.0 | 28.3 |

As seen from Table 4, filaments 1–4 had substantially the same initial moduli in the longitudinal direction, but there were remarkable differences in the compression degrees which were indication of bending stress. That is to say, the filaments 3 and 4 according to the invention were considerably superior to the filaments 1 and 2 in the bending characteristic.

Furthermore, the highly elastic polymer B used in the Example 2 and the polycaprolactam were copolymerized in ratios suitable to produce such copolyamides that the filaments having various initial moduli were formed of, and the copolyamides and the above-mentioned polycaprolactam were conjugate spun and drawn under the same condition and in the same manner as described above to obtain multifilaments of 70 d./18 f. The resulting multifilaments were subjected to a crimp developing treatment, and the compression degrees of the respective filaments were determined to obtain a result as shown in Table 5.

TABLE 5

| Initial modulus of copolyamide filament (g./d.) | Conjugate state | Initial modulus (g./d.) of composite filament | Compression degree (percent) |
|---|---|---|---|
| 23.2 | Filament 1 | 21.2 | 66.7 |
| 23.2 | Filament 2 | 21.0 | 65.1 |
| 23.2 | Filament 3 | 21.3 | 65.0 |
| 23.2 | Filament 4 | 21.2 | 64.3 |
| 28.3 | Filament 1 | 23.2 | 61.2 |
| 28.3 | Filament 2 | 23.0 | 62.0 |
| 28.3 | Filament 3 | 24.1 | 63.5 |
| 28.3 | Filament 4 | 23.9 | 64.1 |
| 31.2 | Filament 1 | 24.0 | 57.9 |
| 31.2 | Filament 2 | 23.7 | 57.0 |
| 31.2 | Filament 3 | 24.9 | 53.2 |
| 31.2 | Filament 4 | 24.9 | 52.1 |
| 38.5 | Filament 1 | 26.5 | 55.6 |
| 38.5 | Filament 2 | 26.6 | 53.9 |
| 38.5 | Filament 3 | 27.4 | 46.2 |
| 38.5 | Filament 4 | 27.1 | 41.1 |

As seen from Table 5, the filaments 3 and 4 according to the invention produced by using such a copolyamide that forms a filament having an initial modulus more than 10 g./d. higher than that (20.5 g./d.) of the one-component filament composed only of the same polycaprolactam as used in the above-mentioned conjugate spinning, are considerably superior to the filaments 1 and 2 in the bending characteristic. On the other hand, when such a copolyamide that forms a filament having an initial modulus, which is higher than that of the one-component filament composed only of polycaprolactam but is not more than 10 g./d. higher than that, is used, the filament according to the invention shows only substantially the same bending characteristic as that of the conventional filament.

Discussing now in detail the invention with particular reference to multi-core filaments such as shown in FIGS. 4 to 9:

As particularly suitable thermoplastic synthetic polymers to be used for the sheath portion in the present invention, mention may be made of polyamides, such as nylon-5, nylon-6, nylon-7, nylon-11, nylon-66, nylon-610 and polymetaxylylene adipamide, and copolyamides composed of two or more of polymerization units, such as 6/66, 66/610, 6/6I (6I: polyhexamethylene isophthalamide) and 6/6T (6T: polyhexamethylene terephthalamide). Furthermore, polyester copolymers, polyurea copolymers and polyvinyl copolymers, and more particularly polyacrylonitrile copolymers can be used for the sheath portion because of the excellent dyeability.

As the polymers which are applicable to the core portion because of excellent modulus of elasticity and tenacity in spite of poor dyeability, mention may be made of aromatic polyamides, such as polyhexamethylene terephthalamide and polyparaxylylene adipamide, polyurea, polyurethane, aromatic polyesters, such as polyethylene terephthalate, polyester-ethers, polymers of vinyl series, such as polyvinyl chloride, polypropylene, polystyrene, polyvinyl alcohol and polyacrylonitrile, and polyoxymethylene.

In determining a preferable combination to be applied in the present invention from the above described polymers, the values of modulus of elasticity and refractive index after spinning two polymers should be carefully taken into consideration.

The most preferable combination of the polymers is that as the core portion, use is made of polyesteric polymers, such as polyethylene terephthalate and copolymers thereof, and more particularly the copolymers having less than 20% of polyethylene isophthalate or polyethylene paraoxybenzoate, and polyester-ether polymers, such as polyethylene paraoxybenzoate and the copolymers thereof, and as the sheath portion, use is made of polyamidic polymers, such as nylon-6, nylon-66, nylon-610 and copolymers thereof.

A preferable result can be obtained in such as combination that both the modulus of elasticity and the refractive index of the core portion are higher than those of the sheath portion, the modulus of elasticity of the core portions is at least 30 g./d. and that of the sheath portion is at most 35 g./d., the difference between these moduli of elasticity being at least 10 g./d., and the difference in the refractive index between the core portion and the sheath portion in at least one direction being at least 0.05.

It is not necessary for the individual cores (one independent core) spacedly arranged in the cross-section of the unitary filament to have the same cross-sectional area. The cross-sectional area of the individual core is less than 1/4, preferably 1/10–1/100 of the cross-sectional area of the filament. As is influenced by the number, the shape and the arrangement of the cores (the effect of multi-core structure generally appears remarkably when the total cross-sectional area of the cores is more than 10% based on the cross-sectional area of the filament).

Since the two-component multi-core filament according to the invention has not only a unique colour, an excellent dyeability, but also an improved dynamic property, it can be applied to new demands in garments.

These aspects of the invention will be explained in more detail by the following examples.

EXAMPLE 4

Polyethylene terephthalate having an intrinsic viscosity of 0.7 in m-chlorophenol at 30° C. was melted at 280° C., extruded through a spinneret provided with 24 orifices having a diameter of 0.3 mm., quenched and taken up on a tube at a rate of 600 m./min. to obtain undrawn filaments. The undrawn filaments were drawn 4.4 times their original length on snubbing pins being kept at 70° C. and then brought into contact with a metal heater having a length of 40 cm. and kept at 135° C. while being drawn by 1% and taken up on a bobbin at a rate of 600 m./min. to obtain a yarn A of 72 deniers/24 filaments, each unitary filament of which had a refractive index of 1.67 in the axial direction.

Nylon-6 having an intrinsic viscosity of 1.2 in m-cresol at 30° C. was spun, drawn and heat-treated in the same manner as described above to obtain a yarn B of 72 deniers/24 filaments, each unitary filament of which had a refractive index of 1.54 in the axial direction.

Nylon-66 having an intrinsic viscosity of 1.07 in m-cresol at 30° C. was spun, drawn and heat-treated in the same manner as described above to obtain a yarn C of 72 deniers/24 filaments, each unitary filament of which had a refractive index of 1.55 in the axial direction.

All of the obtained drawn filaments were transparent and lustrous, because pigments, such as titanium oxide, were not contained in the polymers.

Then, a two-component multi-core filament was spun by means of a spinneret for conjugate spinning provided with 24 orifices and having a structure as shown in FIG. 12, wherein two of the above-mentioned three polymers were used in combination.

As the core-forming polymer, the above-mentioned polyethylene terephthalate was used, and as the sheath-forming polymer, the above-mentioned nylon-6 was used. The two polymers were melted separately and fed by gear pumps at a delivery ratio of 1:2 to effect conjugate spinning. In the spinneret for conjugate spinning, the diameter of the spinning orifice was 0.3 mm. and the interior orifice corresponding to the spinning orifice was composed of a central orifice having a diameter of 0.5 mm. and eight orifices having a diameter of 0.15 mm. which were arranged at the same distance from and concentrically to the central orifice on the circumference having a diameter of 3 mm. The polymers extruded through the orifices at a temperature of 280° C. were quenched and taken up on a tube and then in the same manner as described in the yarn A, drawn and heat-treated to obtain a yarn D of 72 deniers/24 filaments, each unitary filament of which had a cross-section as shown in FIG. 4.

While, by using the above-mentioned nylon-66 instead of the above-mentioned polyethylene terephthalate as the core-forming polymer, a yarn E of 72 deniers/24 filaments, each unitary filament of which had a cross-section as shown in FIG. 4, was obtained in the same manner as described in the yarn D.

For the comparison, by using a spinneret for conjugate spinning composed of orifices having single inner orifice, the above-mentioned polyethylene terephthalate and the above-mentioned nylon-6 were conjugate spun to obtain undrawn filaments, in which the polyethylene terephthalate was used as a core portion and the nylon-6 was used as a sheath portion, and then the resulting undrawn filaments were drawn and heat-treated in the same manner as described in the yarn A to obtain a yarn F of 72 deniers/24 filaments, each unitary filament of which had a sheath-core type cross-section in a conjugate ratio of 1:2. Furthermore, the above-mentioned polyethylene terephthalate and the above-mentioned nylon-6 were conjugate spun at a conjugate ratio of 1:6 in the same manner as described in the specification of the Japanese patent application publication No. 29,636/64, in which the polyethylene terephthalate was used as a core portion and the nylon-6 was used as a sheath portion, and then the resulting undrawn filaments were drawn and heat-treated in the same manner as described in the yarn A to obtain a yarn G of 72 deniers/24 filaments, each unitary filament of which had a cross-section as shown in FIG. 1.

The yarn D has poor transparency and luster, but the yarns E, F and G have fairly excellent transparency and luster. The yarn A, when dyed with acid dyes, hardly absorbed the acid dyes, but the yarns D, E, F, G as well as B were dyed with acid dyes very well, and the yarn C was slightly inferior to those yarns.

The dye adsorptivity of these yarns, when they were dyed with 10% (O.W.F.) of Rokuserin NS (trade name, manufactured by Sumitomo Chemical Co.) and 1% (O.W.F.) of acetic acid at a bath ratio of 1:50 at 80° C. for 60 minutes, and the initial modulus and delustering effect of the yarns are shown in Table 6.

TABLE 6

| Sample | Dye adsorption (percent) | Initial modulus (g./d.) | Delustering effect |
|---|---|---|---|
| Yarn: | | | |
| A, polyester yarn | <1 | 74.0 | Poor. |
| B, nylon-6 yarn | 96 | 29.2 | Do. |
| C, nylon-66 yarn | 74 | 35.1 | Do. |
| D, yarn according to the invention | 93 | 45.0 | Good. |
| E, control yarn | 92 | 30.7 | Slightly poor. |
| F, control yarn | 90 | 44.1 | Do. |
| G, control yarn | 92 | 34.9 | Do. |

EXAMPLE 5

The yarns B, C, D, E, F and G shown in Example 4 were subjected to crimp developing treatment under the condition shown in the following Table 7 on a false twisting machine.

TABLE 7

| | Condition |
|---|---|
| Feed rate _____m./min__ | 50 |
| Revolution velocity of spindle _____r.p.m__ | 140,000 |
| Heater (curved plate): | |
| Length _____cm__ | 60 |
| Surface temp. _____° C__ | 175 |
| Delivery rate _____m./min__ | 51 |
| Take up rate _____m./min__ | 43 |

Then, the resulting S twisted filament and Z twisted filament were doubled and twisted 120 turns/m., after which a skein of the yarn of about 1,000 deniers was produced. The skein was boiled in water at 100° C. under a tensionless state for 10 minutes and air-dried, and then measured with respect to the crimping property, in the manner explained above in Example 1.

The yarns B, C, D, E, F and G, after being subjected to a crimp developing treatment, had an elongation and a crimp recovering percentage for elongation as shown in Table 8 respectively.

TABLE 8

| Sample | Elongation (percent) | Crimp recovering percentage for elongation (percent) |
|---|---|---|
| Yarn: | | |
| B | 53.2 | 15.0 |
| C | 61.0 | 16.3 |
| D | 72.4 | 17.7 |
| E | 55.2 | 14.7 |
| F | 50.9 | 14.4 |
| G | 50.9 | 14.4 |

When the initial load and the recovering load are as relatively large as 20 mg./d., the yarn D according to the invention shows excellent properties. Such a yarn can produce knitted and woven fabrics having an improved bulkiness and resiliency.

On the other hand, the determination of the elongation and the crimp recovering percentage for elongation under a load of 2 mg./d. of the initial load and the recovering load instead of 20 mg./d. in the above Formulae I and II provides the results as shown in Table 9, and there is a small difference between the yarns B, C, D, E, F and G.

TABLE 9

| Sample | Elongation (percent) | Crimp recovering percentage for elongation (percent) |
|---|---|---|
| Yarn: | | |
| B | 593 | 77.6 |
| C | 612 | 80.2 |
| D | 616 | 79.0 |
| E | 590 | 75.2 |
| F | 595 | 77.1 |
| G | 588 | 78.5 |

What we claim is:

1. A composite filament comprising a sheath portion of a first fiber-forming polymeric material having excellent dyeability properties, having an elasticity modulus not greater than 35 g./d. and being selected from the group consisting of an aliphatic polyamide and a copolymer thereof with a small amount of an aromatic polyamide, and a core portion of a second fiber-forming polymeric material having excellent elasticity, having an elasticity modulus not lower than 30 g./d. and being selected from the group consisting of an aromatic polyester, an aromatic polyamide, polystyrene, polypropylene, polyvinyl chloride and polyurea, said second material having an elasticity modulus at least 10 g./d. higher than that of said first material, wherein said sheath- and core-forming polymeric materials have different indexes of refraction, the difference of said indexes being at least 0.05 in at least one direction, said first material is located in the cross-section of said filament both adjacent to the periphery and in an adjacent to the center thereof and said second material is spaced both from said periphery and said center and has the greater part of its individual cross-sectional area between the periphery of said filament and an imaginary line which has a shape identical to that of the periphery of the filament and which bisects a radius of the cross-section or the distance between the center of gravity and the periphery of the cross-sectional area of said filament, the amount of said second fiber-forming polymeric material being from 10 to 50% by volume and the cross-sectional area of the core is from $\frac{1}{10}$–$\frac{1}{100}$ of the cross-sectional area of said composite filament.

2. The composite filament of claim 1, wherein the core portion consists of a plurality of portions individually embedded in the said first polymeric material.

3. The composite filament of claim 1, wherein the core portion consists of an annular portion intermediate between said center and said peripheral portions formed by said first sheath-forming material.

4. The composite filament of claim 3, wherein the said annular core portion has a configuration corresponding to that of the outline of the cross-section of the filament.

5. The composite filament of claim 3, wherein the said annular core portion is entirely located outside said imaginary line.

References Cited

UNITED STATES PATENTS

| 2,932,079 | 4/1960 | Dietzsch et al. | 161—175 |
| 3,531,368 | 9/1970 | Okamoto et al. | 161—177 |
| 3,568,249 | 3/1971 | Matsui | 264—171 |
| 3,415,920 | 12/1968 | Lee et al. | 264—171 |
| 3,485,912 | 12/1969 | Schrenk et al. | 264—177 |

ROBERT F. BURNETT, Primary Examiner

L. T. KENDELL, Assistant Examiner

U.S. Cl. X.R.

161—173, 177; 264—171, 177; 18—8 SC